United States Patent [19]

Yoon

[11] Patent Number: 5,165,449

[45] Date of Patent: Nov. 24, 1992

[54] DISCHARGE VALVE FOR A COMPRESSOR

[75] Inventor: Deok Y. Yoon, Kwangmyeong, Rep. of Korea

[73] Assignee: Samsung Electronics Co., Ltd., Kyungki, Rep. of Korea

[21] Appl. No.: 715,604

[22] Filed: Jun. 14, 1991

[30] Foreign Application Priority Data

Aug. 8, 1990 [KR] Rep. of Korea ............. 90-12171[U]

[51] Int. Cl.⁵ .............................................. F16K 15/14
[52] U.S. Cl. .................................... 137/851; 137/852
[58] Field of Search ............................ 137/851, 852

[56] References Cited

U.S. PATENT DOCUMENTS

| 1,637,821 | 8/1927 | Heideman | 137/851 X |
|---|---|---|---|
| 2,922,435 | 1/1960 | Edwards | 137/851 X |
| 3,895,747 | 7/1975 | Aoki | 137/851 X |
| 4,305,424 | 12/1981 | Wankel | 137/851 X |

Primary Examiner—Robert G. Nilson
Attorney, Agent, or Firm—Robert E. Bushnell

[57] ABSTRACT

A discharge valve for a compressor having a closed polygonal loop shape and provided with a shutting device formed as a protrusion for tight insertion into a discharge passage, a shutting member in close contact with a valve plate, flexible device continued from the shutting member and providing the shutting member and the shutting device with elasticity, against compressed refrigerant, and a fixing device mounted on an inner ceiling of a cylinder head is disclosed. The discharge valve provides secure opening and closing of the discharge passage and improved compression as well as simple and compact construction.

20 Claims, 6 Drawing Sheets 5,165,449

DISCHARGE VALVE FOR A COMPRESSOR

BACKGROUND OF THE INVENTION

1. Field of the Invention

This invention relates to a discharge valve for a compressor, especially a reciprocating type compressor, for use in an air conditioner, refrigerator, freezer and the like to supply a high-temperature and high-pressure gaseous thermal medium to a following stage.

2. Description of the Prior Art

Various types of compressors serve the compression process in a refrigeration cycle which consists of compression, condensation, expansion and evaporation to supply a compresed gaseous thermal medium with high-temperature and high-pressure to a following process, are known, and among these, one to be particularly considered the reciprocating compressor.

Such a reciprocating compressor, as shown in FIG. 1 and FIG. 2, generally includes a motor 10 having a rotator 12 with crank shaft 12A, and a compression device 20 which includes a piston 23 connected to a crank shaft 12A through a connecting rod 22 to enable reciprocating motion of the piston 23 and a cylinder 21 containing the reciprocating piston 23. Positioned on the top of the cylinder 21 is a valve plate 30 with a suction passage 31 and a discharge passage 32. A head 40 encloses valve plate 30.

Suction and discharge valve members 33 and 34 are positioned on the inner and outer sides of the valve plate 30, respectively, to selectively control the flow of thermal medium through the respective suction and discharge passage 31 and 32. The inner space of the cylinder head 40 is divided into a discharge chamber 41 and a suction chamber (so-called, a space formed in the other side of the discharge chamber 41 in FIG. 2 and thus can not be seen) which are isolated from each other by a partition (not shown) and contains the respective suction passage 31 and discharge passage 32.

A reciprocating compressor like this has problems in that the noise due to frictional contacts between the discharge valve members 34 as they perform the discharge and suction process is considerable. Also, the remaining thermal medium in the discharge passage 32 results in a lowered deteriorated compressing efficiency.

With reference to FIG. 2, in suction mode of the compression part 20, the backward motion of the piston 23 closes the discharge passage 32 with the aid of the elasticity of the discharge valve member 34 and the generated moment pressure difference between the cylinder 21 and the discharge chamber 41, while the suction valve member 33 opens the suction passage 31 to initiate the suction stroke for bringing the thermal medium into the cylinder 21. When the piston 23 has reached its maximum travel from the valve plate 30 and initates the compression stroke back toward the valve plate 30, the relative increased pressure in the cylinder 21 and the elasticity of the suction valve member 33 closes the suction passage 31 to end the suction mode.

When the piston 23 has advanced and attained a certain predetermined cylinder pressure, the cylinder pressure forces the discharge valve member 34 against elastic resistance thereof opening the discharge passage 32 and urging the thermal medium in the cylinder 21 into the discharge chamber 41 through the discharge passage 32.

At this time, because the discharge valve assembly 34 consists of a pair of reed type elastic valve seats 341A and 341B, the respective ends of which are bent in an direction opposite to each other, an oppressing plate 342 is placed in parallel manner thereover to keep seats 341A and 341B in position, together with a restrainer 343 and a keeper 344, the slipping friction among the members generates considerable noise.

Moreover, the discharge valve members 341A, 341B, 342, 343 and 344 are mounted at both ends of the valve plate 30 by a pair of fixing pins 345A and 345B. The fixing pins 345A and 345B are parallel and spaced apart from each other with the members 341A, 341B, 342, 343 and 34 superposed one on another therebetween in a vertical arrangement. Thus, when the piston 23 performs the suction mode, the middle part of the valve seat 341A is slightly drawn into the discharge passage 32 by the negative pressure in the cylinder 21 to close the passage 32.

In this type of compressor, there is a problem in that the valve seat 341A, originally having flat reed shape, could not provide complete isolation of the discharge passage 32 and allowed a small amount of backward flow of the compressed gas around the discharge passage 32 resulting in the deterioration of the compressor efficiency.

In the discharge mode, there is also a problem in that the striking contact of the returning valve seat 341A against the valve seat 341B and the vibration of the seats 341A and 341B due to their elasticity and to the discharge pressure from the cylinder 21 were resulted in vibration noises.

In addition to these problems, the complicated construction and difficult assembly of the discharge valve assembly 34 which consists of numerous components caused reliability problems. The inaccuracy in the fixing regions of the fixing pin 345A and 345B for mounting the valve members on the valve plate 30 gave rise to leakage of the thermal medium which also deteriorated of the compressor efficiency.

During the initiation of the suction process, the thermal medium remaining in the discharge passage 32 was mixed with the newly medium drawn therein and then reexpanded. Thus, the energy used to compress this small amount of thermal medium was lost, which added to the lowering of the efficiency of the compressor.

For reducing noise, U.S. Pat. No. 4,537,566 (Aug. 8, 27, 1985) disclosed a valve assembly for a compressor which includes a valve plate having a gas passage extending therethrough, an elongated valve member having a portion overlying the passage and operative to selectively control flow of gas therethrough, resilient biasing device acting on the valve member for exerting a moment thereon, and fastner means extending from the valve plate for retaining the biasing device and the valve member in assembled relation with the valve plate.

However, while this valve assembly achieved a significant decrease in the compressor noise level, but was attended with a slight decrease in operating efficiency.

The problems of the above mentioned leakage of thermal medium in conjuction with the fastner device or fixing pins, and the decrease in compressor efficiency due to gas remaining in the discharge passage reults from the use of reed type valve members were not eliminated.

SUMMARY OF THE INVENTION

Accordingly, an object of this invention is to provide a discharge valve which significantly reduces the noise generated in the discharge mode by a discharge valve member made of a single plate, and which can be easily mounted in the cylinder head with improved gas sealing and reduced thermal medium gas remaining in a cylinder to result in improved compressor efficiency.

According to the present invention, there is provided a refrigerant discharge valve for a compressor having a closed polygonal loop shape of a single strip plate including a shutting device formed as a protrusion inserting tightly into a discharge passage; a shutting member contacted closely on a valve plate in time of inserting of the shutting device to shut off the refrigerant from the discharge passage; device continued from the shutting member and providing the shutting member and the shutting device with elasticity against compressed refrigerant; device continued flatly from the elastic means to support the shutting member and the shutting device; a fixing means bended perpendicularly to the supporting means and mounted on a inner ceiling of a cylinder head.

BRIEF DESCRIPTION OF THE DRAWINGS

Further objects and advantages of the present invention will become apparent from the subsequent description and the appended claims in conjuction with the accompanying drawings, in which:

DESCRIPTION OF THE PREFERRED EMBODIMENTS

Figure 1:
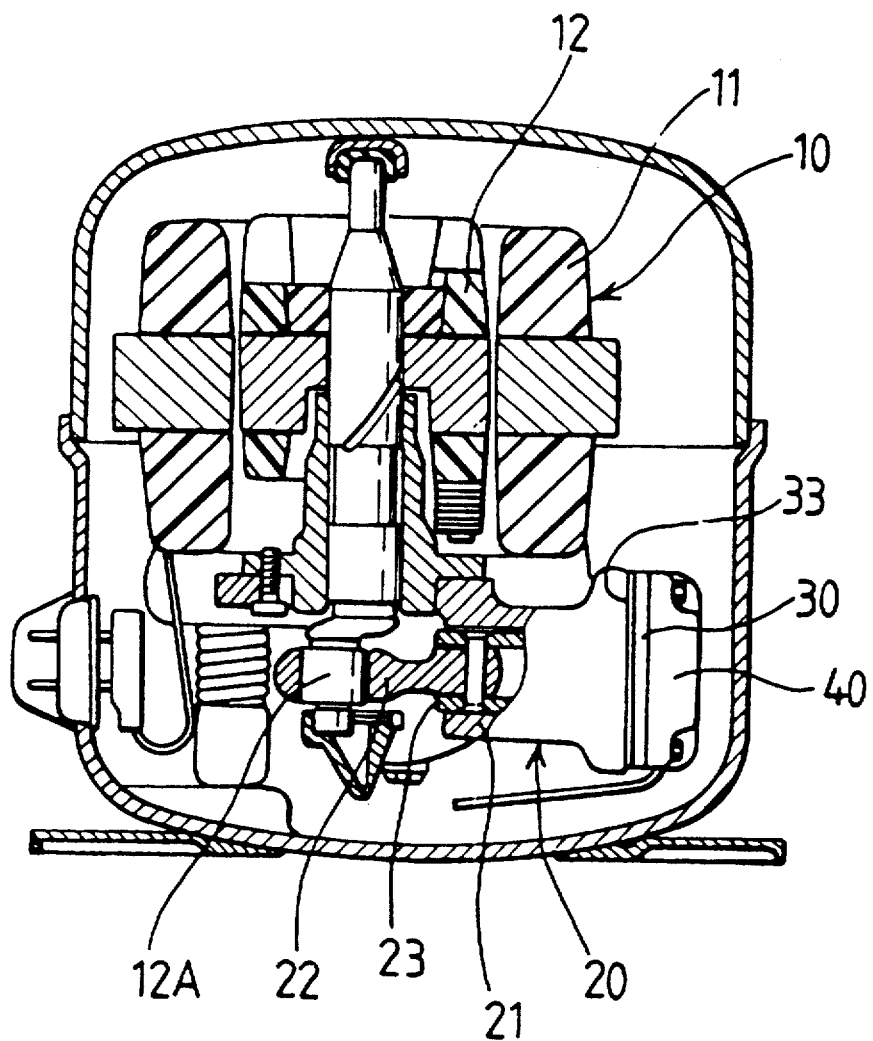
FIG. 1 is a longitudinal sectional view of a general compressor.
Figure 2:
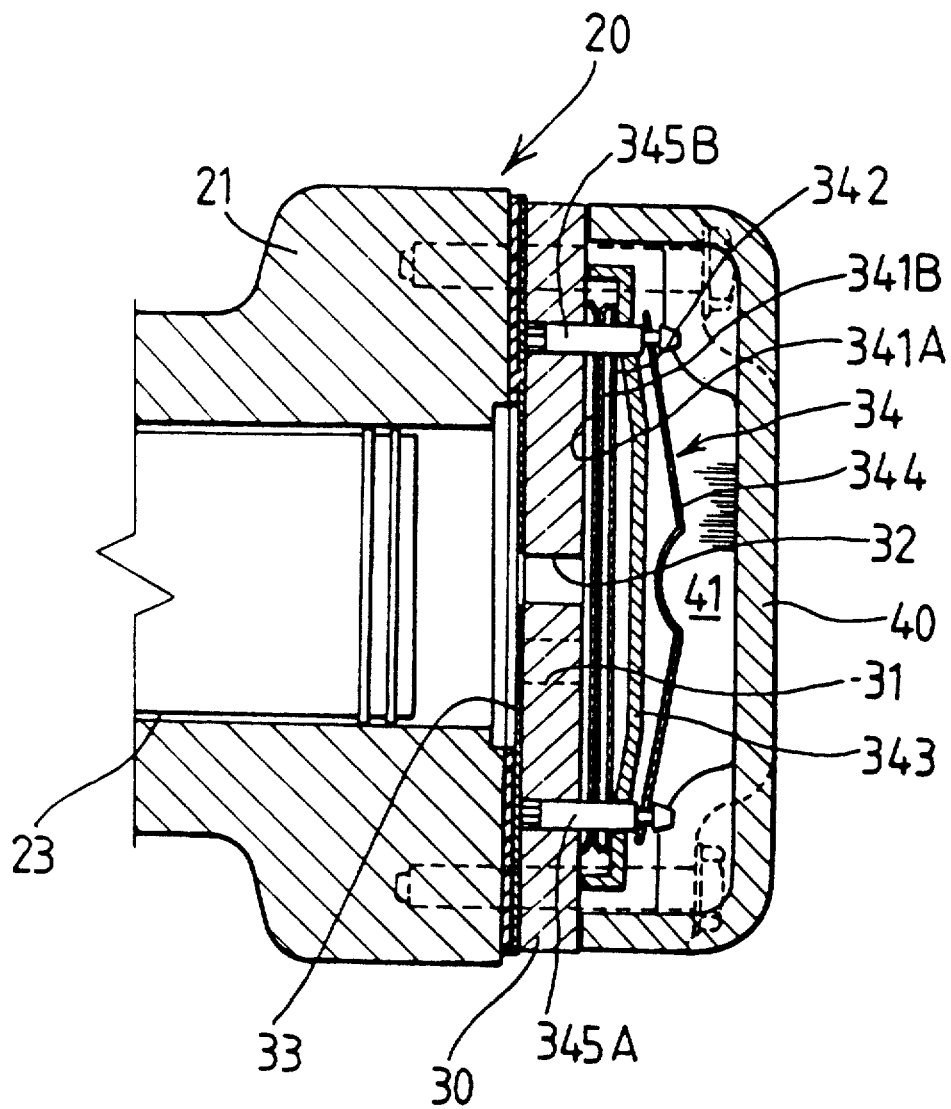
FIG. 2 is a sectional view showing the prior art discharge valve assembly.
Figure 3:
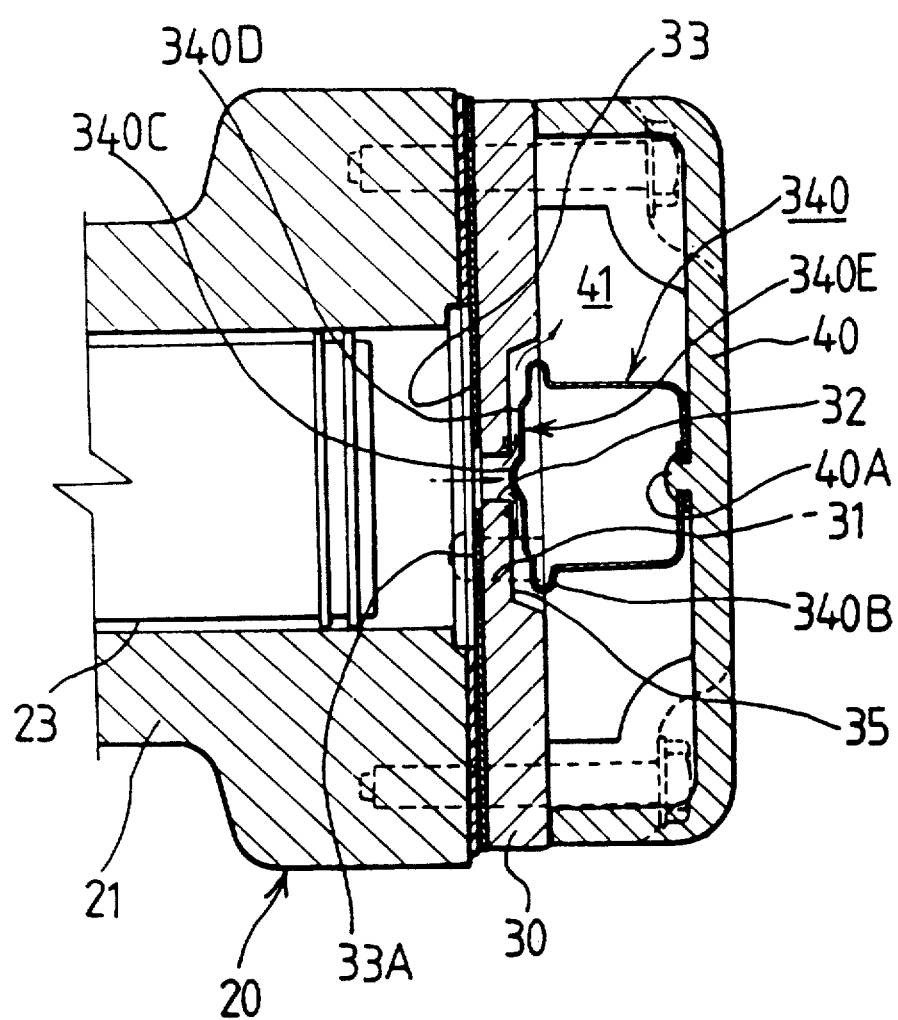
FIG. 3 is a sectional view of the discharge valve according to this invention.

FIG. 3 is a sectional view of the essential parts of the compression device 20 including a discharge valve 340, a valve plate 30, a piston 23, a compressor cylinder 21 and a cylinder head 40. The valve plate 30 closes top opening of the cylinder 21 and is enclosed by the cylinder head 40. The inner space between the valve plate 30 and the cylinder head 40 is divided into a discharge chamber 41 and a suction chamber (not shown) by a partition (also not shown) which are isolated from one another.

The valve plate 30 is provided with a discharge passage 32 and a suction passage 31 which lead from the respective discharge or suction chamber into the cylinder 21, and a reed type suction valve 33, generally made of plate spring, for opening and shutting the suction passage 31 between cylinder 21 and valve plate 30.

The suction valve 33 opens and shuts the suction passage 31 depending on relative low pressure difference between cylinder 21 and suction chamber. That is, in initiating the suction stroke by the piston 23, the suction valve 33 in contacted with the valve plate 30 to shut the suction passage 31, retracts from the valve plate 30 and opens the passage 31 to allow the refrigerant to flow into the cylinder 21. When the piston 23 has reached the point of the maximum backward travel and begins to initate the compression stroke, it shuts off the passage 31 to prevent the refrigerant from backflowing into the suction chamber.

Figure 4:
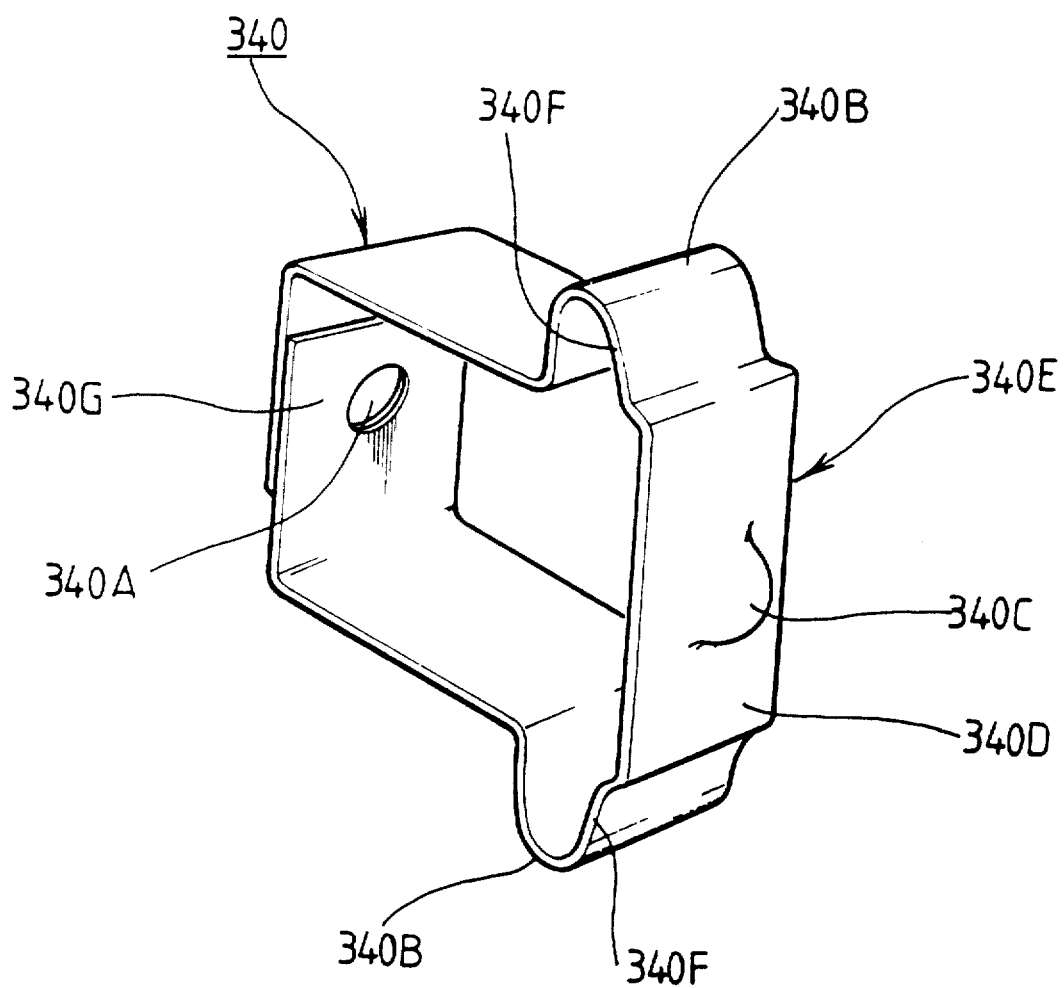
FIG. 4 is a perspective view of the discharge valve.

The discharge valve 340 of this invention is disposed between the inner ceiling of cylinder head 40 and the valve plate 30. The discharge valve 340 (as illustrated in use in FIG. 3) is formed as a resilient single strip plate, which has light mass, adequate stiffness and elasticity with four sides formed in an aproximate square loop as see FIG. 4.

Both end portions of the strip plate overlap each other at one side of the loop. This overlap 340G is pierced by a opening 340A in which a projection 40A, positioned on the ceiling of the cylinder head 40, is fixed received to securely mount the discharge valve 340 on the ceiling of the cylinder head 40. Other fixing device such as a screw or the like may be used to secure valve 340 to the ceiling of the cylinder head 40.

The side opposite to the overlap side 340G is positioned against the face of the valve plate 30 and serves as a shutter 340E for the discharge passage 32. The shutter 340E consists of a contact surface 340D which-contacts the valve plate 30 and a shutting protrusion 340C formed in middle of the surface 340D as a hemisphere. The curvature radius of the shutting protrusion 340C is equal or larger than the inner diameter of the discharge passage 32 to open and shut the discharge passage 32 upon movement out of and into the discharge passage 32, respectively. The area of the contact surface 340D is adequately set to support the discharge valve 340 between the valve plate 20 and the cylinder head 30.

The valve plate 30 is preferably provided with a recess 35 for receiving the shutter 340E of the discharge valve 340 to ensure the secure positioning of the discharging valve 340.

The remaining two sides connect the shutter side 340E and the overlap side 340G and each includes a flexible portion 340B with an outward extending circular arc to provide the shutter 340E with sufficient elasticity.

The function of the discharge valve 340, as constructed above, will be now explained with reference to FIGS. 5 and 6.

Figure 5:
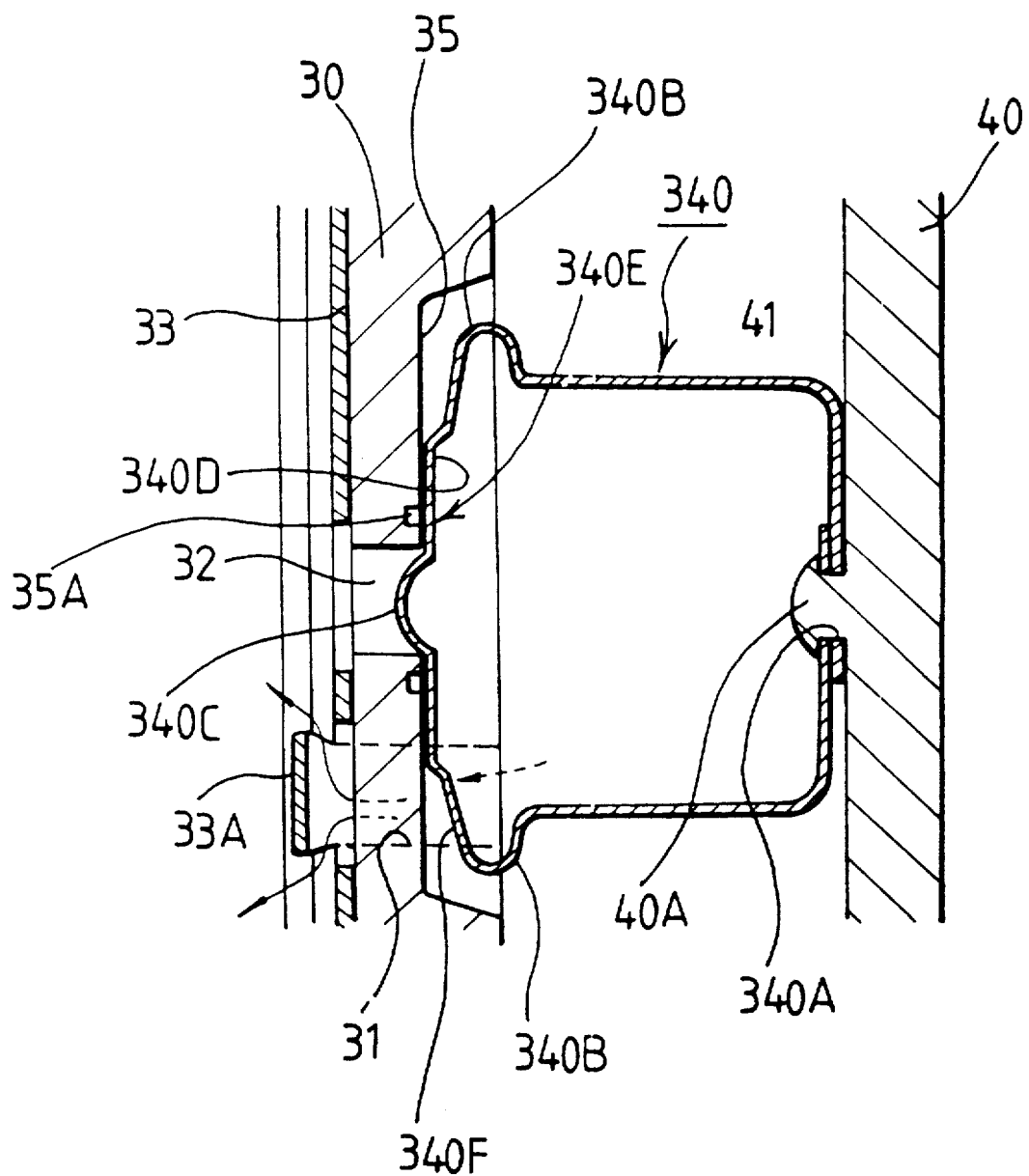
FIG. 5 is an enlarged longitudinal sectional view showing the discharge valve in the suction state.
Figure 6:
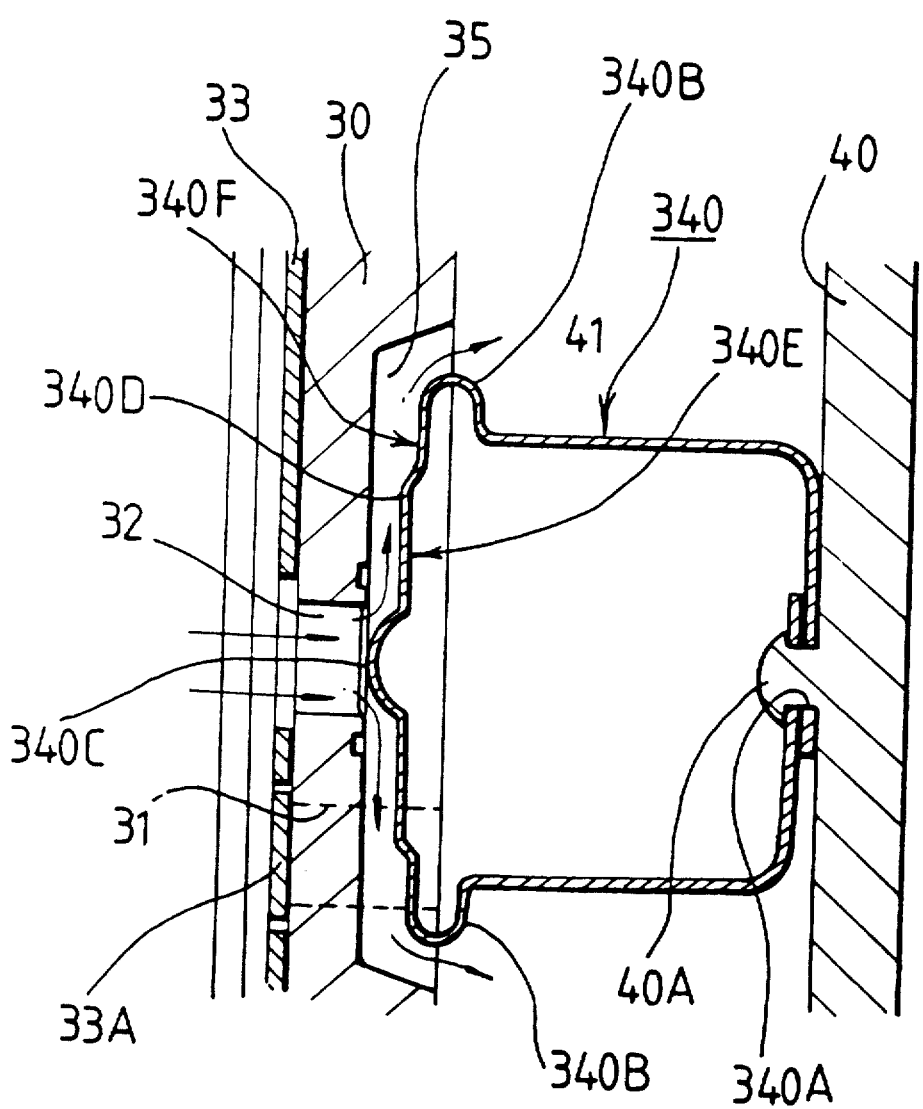
FIG. 6 is an enlarged longitudinal sectional view showing the discharging valve in the discharge state.

In the suction process, the piston 23 performs suction through the opened suction passage 31, while the shutter 340E of the discharge valve 340, as shown in FIG. 5 closes the discharge passage 32 with shutting protrusion 340C inserted into the passage 32 and contact surface 340D in sealing contact with the valve plate surface by the help of the elasticity of the discharge valve 340 and the pressure difference between the cylinder 21 and the discharge chamber 41.

The global surface of the shutting protrusion 340C travels linearly along the edge of the passage 32 and at same time the contact surface 340D contacts with the valve plate surface in the recess 35 around the pheriphery of the passage 32 to achieve a double sealing system, so that backflowing of the thermal medium from discharge chamber 41 to cylinder 21 is not impossible. Herein, the recess 35 is provided with a plurality of trepans 35A formed on its bottom surface in a proper arrangement.

Subsequently, when suction process is initiated and the cylinder pressure rises enough to overcome the elasticity force of the valve 340 and the residual pressure in the chamber 41, the discharge valve 340, especially the circular arc of the flexible portion 340B, becomes deformed and opens the discharge passage 32 to allow discharge of the high temperature and high pressurcompressed gas into the discharge chamber 41.

In this manner, the discharge valve 340 repeatedly opens and shuts of the discharge passage 32 with significantly reducing the operating noise generated during its operation. That is, the valve 340 uses no contacting noise generating member and the arc shaped flexible portion 340B smoothly receives the discharge pressure fluctuation and the valve deformation in a quiet and smooth manner. Moreover, the globular shaped shutting protrusion 340C and the contact surface 340D effectively prevent the backflow of the discharged thermal medium to improve compressor efficiency In addition, the discharge valve according to the invention shows supplementary advantages in that the reduced thermal medium remaining in the discharge passage due to the globular shape of the shutting protrusion enclosures the compressor efficiency, and the compact and simple construction makes its use in assembling and production very easy.

It will be understood that the discharge valve has been described hereinbefore and illustrated in the accompanying drawings as but one satisfactory example and that changes, variations and modifications of the construction details described and illustrated may be resorted to without departing from the sprits of the invention as set forth in the claims hereunto appended.

What is claimed is:

1. A discharge valve for use with a reciprocating piston compressor having a closed polygonal loop shape of a single strip plate, said discharge valve comprising:
    a shutting member engageable with a valve plate, for regulating flow of compressible gas through an opening of a discharge passage within said valve plate, said shutting member having a protrusion portion for closing said opening of said discharge passage by inserting said protrusion portion into said discharge passage in dependence upon operation of said reciprocating piston compressor;
    supporting means connectable to said shutting member, for providing flexible support to said shutting member and said protrusion portion; and
    fixing means bent in a direction perpendicular to said supporting means, for mounting on an inner ceiling of a cylinder head.

2. A discharge valve for use with a reciprocating piston compressor for opening and closing a discharge passage in a valve plate in a compressor head having a suction chamber and a discharge chamber, said discharge valve being constructed of resilient materials forged in a polygonal shape, said discharge valve in said polygonal shape having a mounting portion formed on a first side of said polygonal shape for mounting on an inner ceiling of said compressor head, a pair of flexible portions formed on both lateral sides of said polygonal shape, and a shutter portion formed on a second side opposite to said first side and disposed between said flexible portions for opening and closing said discharge passage in dependence upon operation of said reciprocating piston compressor.

3. The discharge valve according to claim 2, wherein said polygonal shape of said discharge valve is three-dimensional and made of a single strip of resilient materials.

4. The discharge valve according to claim 2, wherein said shutter portion comprises connecting portions connectable with said flexible portions, and a contact surface extendable from said connecting portions for closing the periphery of said discharge passage, said contact surface having a shutting surface formed in a middle cross-section and engageable to said discharge passage for opening and closing said discharge passage.

5. The discharge valve according to claim 4, further comprised of said shutting surface having a partial globe shape protruding from said contact surface toward said discharge passage in said valve plate.

6. The discharge valve according to claim 4, further comprised of said shutter portion being disposed to shut off said discharge passage in said valve plate together with said shutting surface and said contact surface.

7. The discharge valve according to claim 5, further comprised of said partial globe shape protruding from said shutting surface and extending into said discharge passage to occupy portions of said discharge passage.

8. The discharge valve according to claim 5, further comprised of said flexible portions being bent in a circular arc shape.

9. The discharge valve according to claim 7, wherein said flexible portions are disposed opposite to said discharge passage in said valve plate for providing elasticity to said discharge valve in opening and closing said discharge passage.

10. The discharge valve according to claim 2, wherein said mounting portion is perpendicularly bent in an opposite direction with respect to said valve plate for rigidly mounting on said inner ceiling of said compressor head.

11. A discharge valve, comprising:
    a substantially flat base portion engageable with a valve plate, for regulating flow of compressible gas through an opening of a discharge passage within said valve plate, said substantially flat base portion having a protrusion for engaging said opening of said discharge passage and for disengaging from said opening of said discharge passage;
    a head portion mountable with a cylinder head, for rigidly holding said valve onto said cylinder head when said protrusion of said substantially flat base portion disengages from said opening of said discharge passage, said head portion being parallel with said substantially flat base portion; and
    side portions connectable to respective corresponding ends of said substantially flat base portion and said head portion, for providing structural support to said substantially flat base portion and said head portion.

12. The discharge valve as claimed in claim 11, further comprised of said side portions having resilient portions being constructed in a circular arc shape for providing flexibility to said valve when said protrusion engages said opening of said discharge passage or disengages from said opening of said discharge passage.

13. The discharge valve as claimed in claim 11, further comprised of said head portion having an opening for securing said valve onto said cylinder head.

14. The discharge valve as claimed in claim 13, wherein a center of said protrusion is co-axially aligned with a center of said opening of said head portion.

15. The discharge valve as claimed in claim 11, wherein said protrusion is proportional in diameter to said opening of said discharge passage.

16. A valve constructed of a single piece of resilient material in a polygonal shape for use within a discharge chamber between a valve plate and a cylinder head of a compressor having a cylinder operated in one of a suction mode and a compressor mode, said valve comprising:
- a base portion engageable with a valve plate, for regulating flow of one of compressible gas and fluid through a discharge passage within said valve plate into said discharge chamber, said base portion having a protrusion engageable with an opening of said discharge passage, for closing said opening of said discharge passage to prevent leakage when said cylinder operates in said suction mode;
- a head portion mountable with a cylinder head in a wall opposite to said valve plate, for rigidly holding said valve onto said cylinder head when said protrusion of said base portion disengages from said opening of said discharge passage while said cylinder operates in said compressor mode; and
- side portions connectable to said base portion and said head portion, for providing structural and flexible supports to said base portion and said head portion.

17. The valve as claimed in claim 16, further comprised of said side portions having resilient portions being constructed in a circular arc shape.

18. The valve as claimed in claim 16, further comprised of said head portion having an opening for securing said valve onto said cylinder head.

19. The valve as claimed in claim 16, further comprised of a center of said protrusion being co-axially aligned with a center of said opening of said head portion.

20. The valve as claimed in claim 16, wherein said protrusion is proportional in diameter to said opening of said discharge passage.

* * * * *

UNITED STATES PATENT AND TRADEMARK OFFICE
CERTIFICATE OF CORRECTION

PATENT NO. : 5,165,449
DATED : November 24, 1992
INVENTOR(S) : Deok-Young YOON

It is certified that error appears in the above-indentified patent and that said Letters Patent is hereby corrected as shown below:

Column 3,

Line 13,    after "including", insert a colon -- : --:

Signed and Sealed this

First Day of October, 1996

Attest:

BRUCE LEHMAN

Attesting Officer    Commissioner of Patents and Trademarks